(12) United States Patent
Ramachandran et al.

(10) Patent No.: US 9,088,306 B1
(45) Date of Patent: *Jul. 21, 2015

(54) PROVISIONING A WIRELESS-CAPABLE DEVICE FOR A WIRELESS NETWORK

(71) Applicant: Emerson Electric Co., St. Louis, MO (US)

(72) Inventors: Anil Ramachandran, Sunnyvale, CA (US); Matt McAdams, Troy, OH (US)

(73) Assignee: Emerson Electric Co., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,876

(22) Filed: Apr. 20, 2015

Related U.S. Application Data

(63) Continuation of application No. 13/887,439, filed on May 6, 2013, now Pat. No. 9,014,686.

(51) Int. Cl.
*H04M 3/00* (2006.01)
*H04B 5/00* (2006.01)
*H04W 24/02* (2009.01)
*H04W 76/02* (2009.01)

(52) U.S. Cl.
CPC ............ *H04B 5/0031* (2013.01); *H04W 24/02* (2013.01); *H04W 76/02* (2013.01)

(58) Field of Classification Search
USPC ......... 455/418–420, 41.1–41.2, 414.1–414.3, 455/556.1–556.2; 713/185, 186; 705/305
See application file for complete search history.

(56) References Cited

U.S. PATENT DOCUMENTS

| 6,337,635 | B1 | 1/2002 | Ericksen et al. |
| 2007/0230962 | A1 | 10/2007 | Fisher et al. |
| 2010/0081375 | A1* | 4/2010 | Rosenblatt et al. .......... 455/41.1 |
| 2010/0304670 | A1* | 12/2010 | Shuo ............................ 455/41.1 |
| 2012/0029997 | A1* | 2/2012 | Khan et al. ................. 705/14.27 |
| 2013/0171929 | A1* | 7/2013 | Adams et al. ................ 455/41.1 |
| 2014/0181521 | A1* | 6/2014 | Hemphill et al. ............ 713/171 |
| 2014/0274014 | A1* | 9/2014 | Dodla .......................... 455/418 |

\* cited by examiner

*Primary Examiner* — Tuan A Tran
(74) *Attorney, Agent, or Firm* — Harness, Dickey & Pierce, P.L.C.

(57) ABSTRACT

Disclosed are exemplary embodiments of apparatus and methods for provisioning a wireless-capable device for a wireless network. In an exemplary embodiment, a wireless-capable device, e.g., a thermostat, generally includes provisioning component(s) configured to receive from, and without a wired connection to, a wireless user device at least a network profile for provisioning the wireless-capable device for a wireless network. The provisioning components have no capability to receive the network profile through the wireless network. The provisioning component(s) are further configured to provide information for provisioning control of the wireless-capable device to a user account accessible through the wireless network.

8 Claims, 4 Drawing Sheets

PROVISIONING A WIRELESS-CAPABLE DEVICE FOR A WIRELESS NETWORK

CROSS-REFERENCE TO RELATED APPLICATION

This application is a continuation of U.S. patent application Ser. No. 13/887,439 filed on May 6, 2013. The entire disclosure of the above application is incorporated herein by reference.

FIELD

The present disclosure generally relates to wireless-capable devices, and more particularly (but not exclusively) to provisioning a wireless-capable device for a wireless network without using a user interface on the device.

BACKGROUND

This section provides background information related to the present disclosure which is not necessarily prior art.

In climate control systems, thermostats and other controllers may be provided whereby a user can select temperature and other settings. Thermostats typically provide menu items and other features that may be selected by a user, e.g., by touching a touch screen on the device. Wireless-capable thermostats may be configured for communication with a user's home network, e.g., to receive data from remote sensors in the home. Wireless-capable thermostats may also be remotely controlled by users via smart phone, tablet, etc. to manage climate control settings such as when the user is away from home.

SUMMARY

This section provides a general summary of the disclosure, and is not a comprehensive disclosure of its full scope or all of its features.

According to various aspects, exemplary embodiments are disclosed of apparatus and methods for provisioning a wireless-capable device for a wireless network. In an exemplary embodiment, a wireless-capable device generally includes one or more provisioning components configured to receive from, and without a wired connection to, a wireless user device at least a network profile for provisioning the wireless-capable device for a wireless network. The provisioning components have no capability to receive the network profile through the wireless network. The provisioning component(s) are further configured to provide information for provisioning control of the wireless-capable device to a user account accessible through the wireless network.

Also disclosed are methods that generally include a method of provisioning a wireless-capable device for a wireless network. The method includes capturing an image or near field communication (NFC) transmission generated by a user device and extracting information including at least a network profile of the wireless network from the image or transmission. The capturing is performed by one or more provisioning components of the wireless-capable device. The provisioning components have no capability to receive the network profile through the wireless network. The extracted information is used to provision control of the wireless-capable device to a user account accessible through the wireless network.

In another exemplary implementation, a method of provisioning a wireless-capable thermostat for a wireless network includes obtaining, on a user device, provisioning information identifying at least the wireless network. The user device is used in converting the provisioning information into an image and displaying the image. An image-acquiring provisioning component of the thermostat is used in capturing the displayed image on the thermostat, and extracting the provisioning information from the image. The extracted information is used to provision control of the thermostat to a user account accessible through the wireless network.

In another example embodiment, a wireless-capable thermostat generally includes one or more provisioning component for obtaining an image without using a wireless interface of the thermostat. A processor and memory are configured to obtain, from an image obtained by the one or more provisioning component, network profile information for provisioning the thermostat to a wireless network.

In still another example embodiment, a wireless-capable user device generally includes a camera, and a processor and memory configured to obtain, from an image obtained by the camera, at least network profile information for provisioning a wireless-capable thermostat for a wireless network. The at least network profile information is sent wirelessly to the thermostat.

In yet another example embodiment, a wireless-capable thermostat generally includes one or more provisioning components configured to receive from, and without a wired connection to, a wireless user device at least a network profile for provisioning the thermostat for a wireless network. The provisioning components have no capability to receive the network profile through the wireless network. The one or more provisioning components are further configured to provide information for provisioning control of the thermostat to a user account accessible through the wireless network.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The inventors hereof have recognized that it is not always easy for a homeowner to provision a new wireless-capable device such as a thermostat for communication with an existing home network, particularly where the new device does not have a keyboard or other component for user-provided data entry. Accordingly, the inventors have developed and disclose herein exemplary embodiments of apparatus, systems, and methods for provisioning a wireless-capable device for a network, and, in various embodiments, for further provisioning control of the wireless-capable device to a user's account, e.g., an account with an energy management service or utility. In various implementations, the wireless-capable device may have limited or non-existent user interface capabilities. Implementations also are possible, however, in relation to a wireless-capable device that has a keyboard or other data entry component.

In one example embodiment, a wireless-capable thermostat includes one or more provisioning components configured to receive, from a wireless user device, at least a network profile for provisioning the thermostat for a wireless network. In the present embodiment, the provisioning component(s) have no capability to receive the network profile through the wireless network. The provisioning component(s) are further configured to provide information for provisioning control of the thermostat to a user account accessible through the wireless network.

Figure 1:
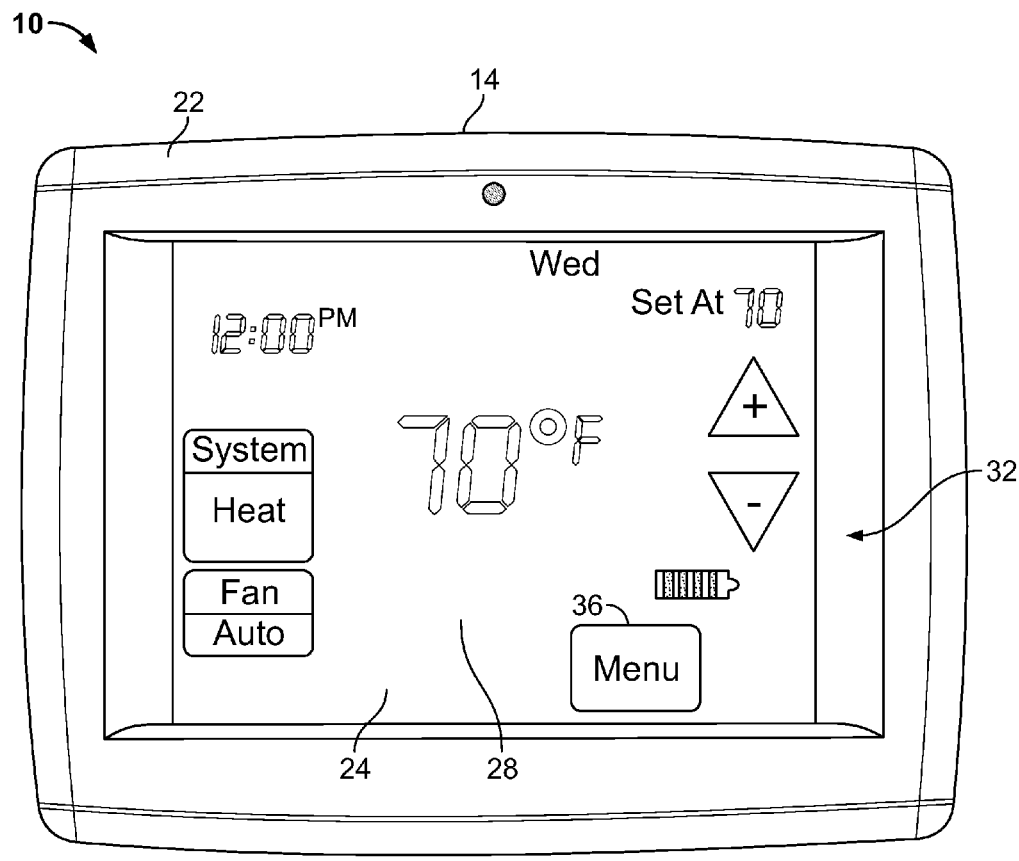
FIG. 1 is a frontal view of an exemplary thermostat in accordance with an exemplary embodiment of the present disclosure.

With reference now to the figures, FIG. 1 illustrates an exemplary embodiment of a wireless-capable device, e.g., a thermostat 10 embodying one or more aspects of the present disclosure. The thermostat 10 is for controlling a climate control system in a residence. Various aspects of the disclosure, however, could be directed to thermostats configured for use in other structures and/or environments. Additionally or alternatively, various aspects of the disclosure could be directed to wireless-capable devices that are not thermostats. The thermostat 10 may be configured to receive power from one or more power source types, including but not limited to a connection to a transformer of the climate control system, a power stealing circuit, one or more batteries, etc.

The thermostat 10 has a housing 14 with a front cover 22 and includes a display device 24 having a display screen 28, which may be a touch screen. The display screen 28 is configured to indicate various environmental conditions detected in the residence, to show various settings that have been programmed into the thermostat 10, and to provide an interface whereby a user, e.g., an owner of the residence, may enter and/or change such settings. The display screen 28 is, e.g., a segmented display. Although a plurality of setting options 32 and menu items 36 are provided, no keyboard or other means are provided whereby a user may enter additional data.

Figure 2:
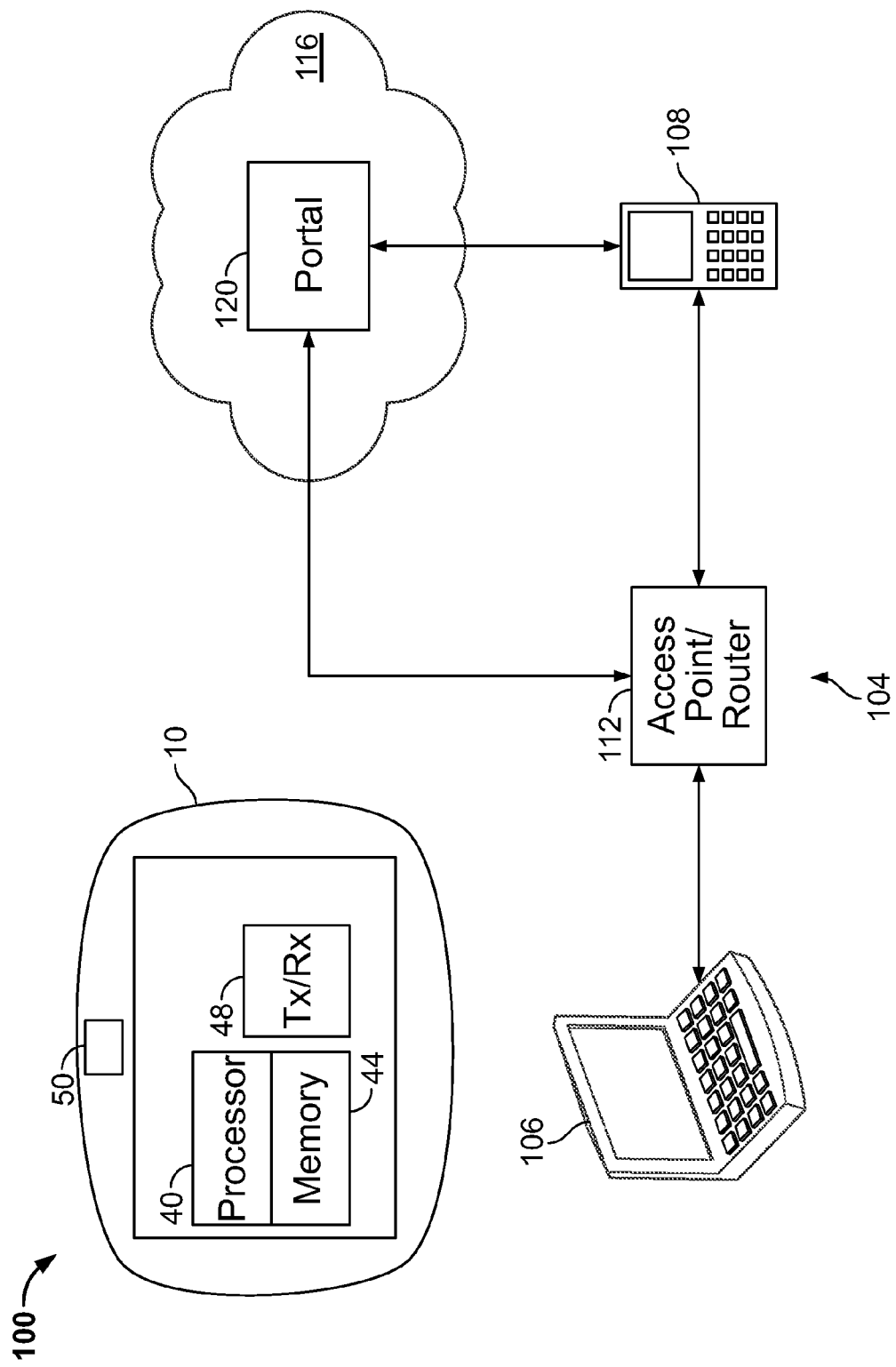
FIG. 2 is a diagram of an exemplary thermostat and wireless network in accordance with an exemplary embodiment of the present disclosure.

FIG. 2 shows the thermostat 10 and an example network 100 for which the thermostat 10 is to be provisioned in accordance with an example implementation. The thermostat 10 includes a microprocessor 40, memory 44, and a wireless network interface 48. The thermostat 10 also includes one or more provisioning components 50, e.g., a camera/scanner for capturing and interpreting image information such as barcodes, data matrix codes, quick response (QR) codes, etc. In various embodiments, provisioning component(s) 50 may include a barcode scanner and decoder circuitry and/or software for analyzing image information from the scanner. The decoded information may be input to the microprocessor 40 and/or stored in memory 44. Various types of provisioning components may be provided in various embodiments, including, e.g., camera-based readers and image-processing software, light source/photodiode combinations and decoding circuitry and/or software, etc. In some embodiments, provisioning component(s) 50 may also include a disturbance sensing component, e.g., an accelerometer, vibration sensor, shock sensor, impact sensor, etc. In various embodiments, a near-field communication (NFC) interface may be provided as a provisioning component.

In various implementations, the thermostat 10 can be provisioned, as described below, for wireless communication with the network 100, e.g., a home network of the user. At least one wireless-enabled user device 104 is connectible in the network 100 and may include, e.g., a laptop 106 and a smart phone 108. User devices 104 may additionally or alternatively include, e.g., home computers, personal computers (PCs), tablets, etc. The network 100 may also include, for example and without limitation, an access point/router 112 in communication with a wide-area network (WAN), e.g., the Internet 116. In various embodiments the home owner may have a user account, e.g., with an energy management service or utility. The home owner may use such an account, e.g., to track and/or manage energy usage in the home. In various embodiments the user account is accessible through a web portal 120. Thus the home owner may use, e.g., the smart phone 108 and/or laptop 106 to remotely and/or locally track and/or manage energy usage in the home through the thermostat 10, after the thermostat 10 has been connected in the network 100 and associated with the user's account.

As shown in FIG. 2, the thermostat 10 is to be provisioned for the network 100 so that the thermostat 10 might be connected into the network 100. Additionally, in various embodiments, control of the thermostat 10 is to be provisioned to the user's energy management account, e.g., via the web portal 120, so that energy management can be performed wirelessly and remotely through the thermostat 10. The thermostat 10 does not include, e.g., a keyboard by which the user might enter data to provision the thermostat 10 for the network 100 and/or user account. In one example implementation, provisioning component(s) 50 of the thermostat 10 may include a NFC interface whereby the thermostat 10 may receive provisioning information from a user device, e.g., a user's smart phone, where the user device 104 also includes a NFC interface. In such implementations, information for provisioning control of the thermostat 10 to the user's account may also be transferred to the thermostat 10 through NFC.

Figure 3:
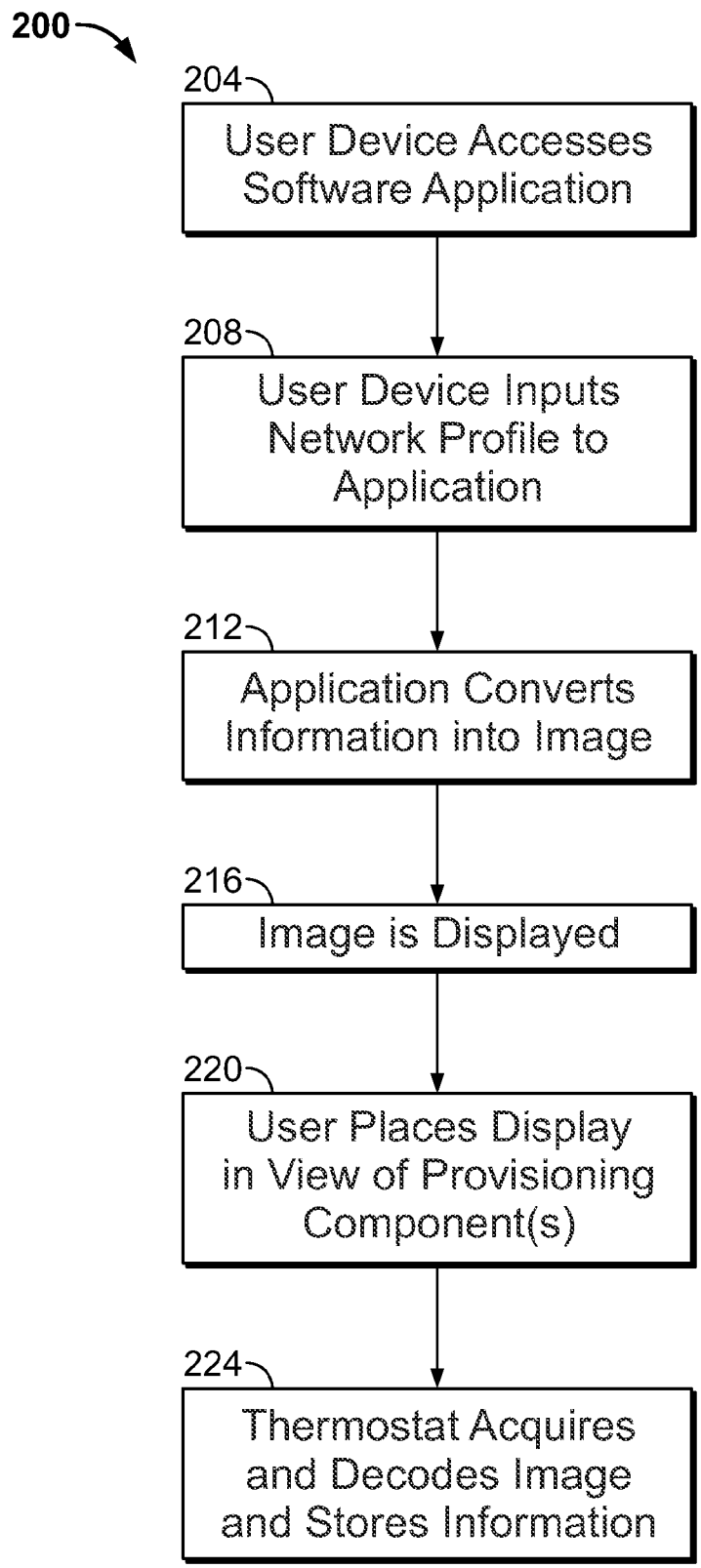
FIG. 3 is a flow diagram of an exemplary method of provisioning a thermostat for a wireless network in accordance with an exemplary implementation of the present disclosure.

In another example implementation, the user may provision the thermostat 10 for the network 100 in accordance with a method indicated generally in FIG. 3 by reference number 200. In the present example implementation, performance of the method 200 shall be described with reference to one of the user devices 104, e.g., the smart phone 108, although the method could be performed using the laptop 106 or other wireless user device 104. In process 204, the smart phone 108 is used to access a software application. For example, the user may download to the smart phone 108 a software application, e.g., from the web portal 120. Additionally or alternatively, the smart phone 108 may access a software application as a web service through the web portal 120, etc.

In process 208, the user inputs to the software application, e.g., via a keyboard of the smart phone 108, at least a network profile, i.e., information identifying the network 100. Such information typically includes but is not necessarily limited to a network name (also known as a service set identification (SSID)), security information, radio type, etc. Additionally or alternatively, where the smart phone 108 is connected to, or at least within connecting range of, the network 100, the user may cause the smart phone 108 to display the profiles of networks currently in range of the smart phone 108, from which the user may select the profile for the network 100 and input it to the software application. The user also may input to the software application information identifying the user's energy management account accessible, e.g., through the web portal 120. Account information may include, e.g., the user's name, phone number, account identifier, etc. In various embodiments, e.g., where the user has invoked the software application by logging into his/her user account through the energy management web portal 120, the software application may already have access to the user's account information, which the application automatically associates with the smart phone 108.

In process 212, the software application converts at least the network profile into an image. For example, the application encodes the information into a visually transferrable form such as a one- or two-dimensional barcode, a data matrix code, etc. In some embodiments the software application may also encode the user's energy management account information into the image. In process 216 the software application may be instructed to output the image e.g., on a display of the smart phone 108. Additionally or alternatively, the software application may be instructed, e.g., by the user, to output the image in a visually transferrable form to another device, e.g., a printer, another display such as a display screen of a tablet or of the user's laptop 106, etc.

In process 220, the user may activate provisioning component(s) 50 of the thermostat 10 to capture and interpret the displayed image. In the present example, the image is a barcode displayed on the display of the smart phone 108, and the provisioning component(s) 50 includes a barcode reader. The user may align the displayed barcode image with the reader, e.g., by holding the smart phone 108 in front of the reader. In process 224 the network profile information and also possibly information, if any, identifying the user's energy management account is extracted from the image and stored, e.g., in the memory 44. The thermostat 10 thus is provisioned for connection with the network 100. Additionally, where energy account information is included in the image, control of the thermostat 10 may be provisioned to the user's energy management account through performance of the foregoing method 200. The user may determine whether the provisioning was successful, e.g., by using the smart phone 108 or other user device in the wireless network to access the thermostat 10 through the user account.

Figure 4:
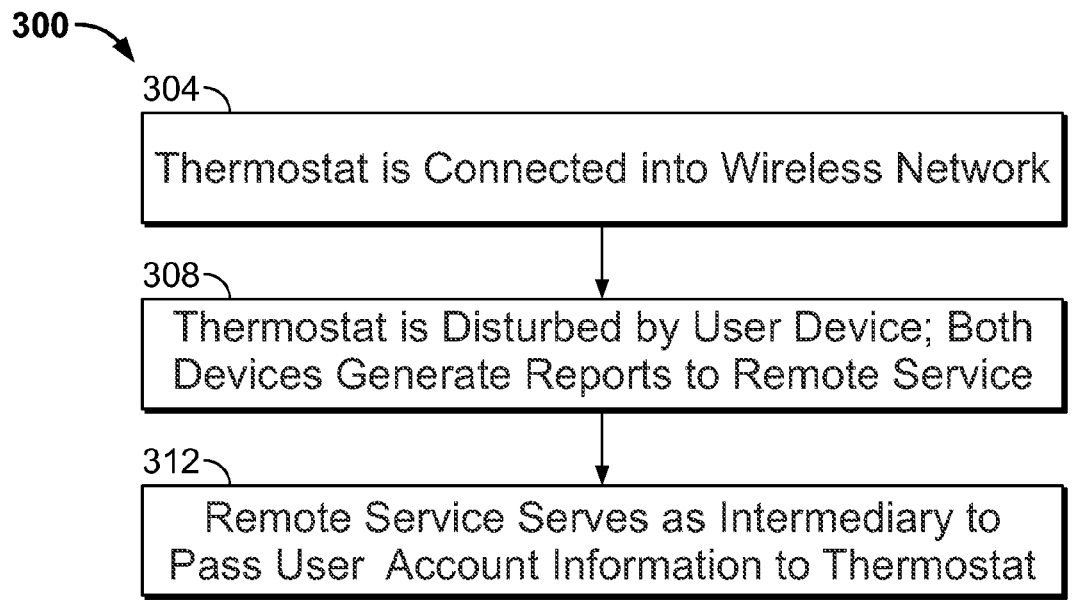
FIGS. 4 and 5 are flow diagrams of exemplary methods of provisioning control of a thermostat to a user account accessible through a wireless network in accordance with an exemplary implementation of the present disclosure.

In some implementations, user account information might not be included in a barcode or other image carrying a network profile. Thus, in various embodiments, example methods are provided by which control of a thermostat may be provisioned to a user's account. One example method is indicated generally in FIG. 4 by reference number 300. In the present example, a thermostat already has been provisioned for a wireless network, e.g., as described above. Provisioning component(s) of the thermostat include a disturbance sensor, e.g., an accelerometer, vibration sensor, etc. In process 304, the thermostat is connected into the wireless network, e.g., by the user through the user's smart phone or other wireless network device. In process 308, the user physically disturbs the thermostat, e.g., by striking it with a user device, e.g., the smart phone, where the smart phone also is equipped, e.g., with an accelerometer. In the present example embodiment, the thermostat and smart phone are each configured to generate reports of such disturbance to a remote service provided, e.g., through a web portal through which the user's account is accessible. The mutual disturbance causes both the thermostat and phone to send reports, e.g., at approximately the same time. When the contemporaneous reports have been validated by the remote service, the remote service serves as intermediary for sending the user account information to the thermostat in process 312. In various embodiments, a thermostat may include other or additional types of provisioning components that may be activated to disturb a thermostat so as to generate transmission of a report over a wireless network.

Figure 5:
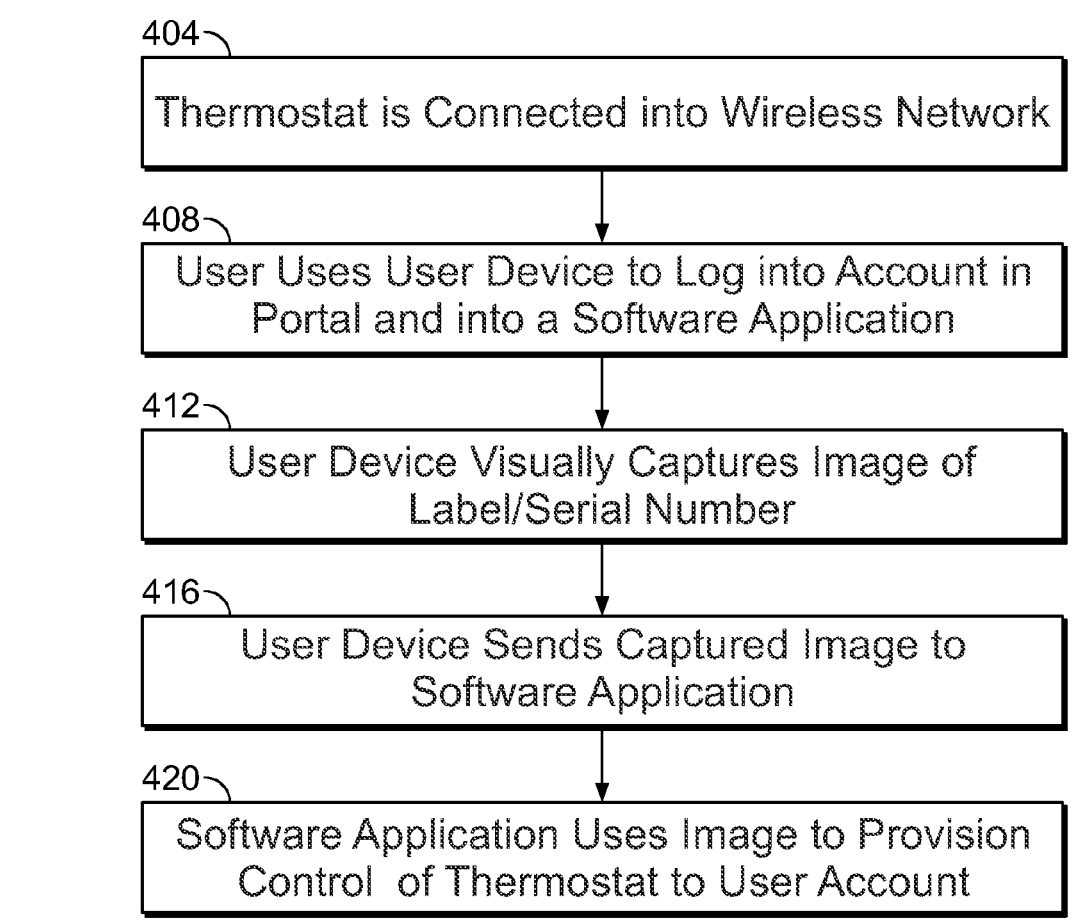

Another example method is indicated generally in FIG. 5 by reference number 400. In the present example, a thermostat already has been provisioned for a wireless network, e.g., as described above. Provisioning component(s) of the thermostat include a physical label, e.g., a QR code, barcode, etc. affixed to the thermostat, and/or a device serial number of the thermostat. In process 404, the thermostat is connected into the wireless network, e.g., by the user through the user's smart phone or other wireless network device. In process 408, the user accesses an energy management web portal and logs into his/her user account on a user device, e.g., the smart phone, which in the present embodiment has a camera. The user also logs into or invokes a software application available on or through the portal. In process 412, the user visually captures an image of the physical label and/or serial number, e.g., by taking a picture of the label/serial number with the smart phone camera. In process 416, the user sends the image from the phone to the software application. In process 420, the application uses the image to provision control of the thermostat to the user account.

Embodiments of the foregoing apparatus and methods make it possible for a user to connect a device that has no user interface to a wireless network, in ways that are substantially secure and that provide instant feedback as to whether the connection was successful. Connections can be made more quickly and smoothly than through the use of current methods, e.g., methods involving USB mass storage. Such methods typically require a device to be a host, may require the payment of a royalty, and do not provide immediate verification of successful connectivity and/or accuracy of the information. The foregoing apparatus and methods also do not require a user to engage in a cumbersome process of entering a device serial number online, as is required in some currently used methods. In embodiments of the foregoing apparatus and methods in which a camera is used, additional security-related functions, e.g., intermittent surveillance, are made possible in relation to a thermostat. Additional functions could also be provided in embodiments in which NFC is used. For example, a NFC interface could be used for direct access to the thermostat by a homeowner using a smart phone at sufficiently close range.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A wireless-capable thermostat comprising:
   one or more provisioning components for obtaining an image without using a wireless interface of the thermostat; and
   a processor and memory configured to obtain, from an image obtained by the one or more provisioning components, network profile information for provisioning the thermostat to a wireless network.

2. The thermostat of claim 1, wherein the one or more provisioning components comprises a camera.

3. The thermostat of claim 1, wherein the processor and memory are further configured to obtain, from the image and/or from a second image, information for provisioning the thermostat to a user account accessible through the wireless network.

4. The thermostat of claim 3, wherein the processor and memory are further configured to provision the thermostat to the user account in coordination with a network application related to the user account.

5. The thermostat of claim 1, wherein the one or more provisioning components comprises a scanner.

6. The thermostat of claim 1, wherein the one or more provisioning components comprises a disturbance sensor, the thermostat further configured to receive information for provisioning control of the thermostat to a user account accessible through the wireless network after an impact between the thermostat and a wireless device when the thermostat is connected with the network.

7. The thermostat of claim 1, wherein the processor and memory are configured to store the network profile information for provisioning control of the thermostat to a user account received by the one or more provisioning components.

8. The thermostat of claim 1, wherein the image is of a physical label that includes one or more of the following: a visible code and a device serial number.

* * * * *